(12) United States Patent
Morita et al.

(10) Patent No.: US 7,426,563 B2
(45) Date of Patent: Sep. 16, 2008

(54) CONTENT PLAYBACK APPARATUS, SERVER CONNECTION METHOD, AND RECORDING MEDIUM

(75) Inventors: Toshihiro Morita, Kanagawa (JP); Osamu Shimoyoshi, Kanagawa (JP); Mikiko Sakurai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 10/425,597

(22) Filed: Apr. 30, 2003

(65) Prior Publication Data

US 2004/0019685 A1     Jan. 29, 2004

(30) Foreign Application Priority Data

May 14, 2002     (JP)     ............... 2002-138511

(51) Int. Cl.
*G06F 15/16*     (2006.01)
(52) U.S. Cl. ..................................... 709/228
(58) Field of Classification Search .......... 709/227–228
See application file for complete search history.

(56) References Cited

U.S. PATENT DOCUMENTS

| | | | |
|---|---|---|---|
| 6,226,684 B1 * | 5/2001 | Sung et al. ................. 709/238 |
| 6,961,714 B1 * | 11/2005 | LeVine ........................ 705/51 |
| 7,020,707 B2 * | 3/2006 | Sternagle ................... 709/230 |
| 2001/0056351 A1 * | 12/2001 | Valentine et al. ............ 704/270 |
| 2002/0065922 A1 * | 5/2002 | Shastri ........................ 709/227 |
| 2002/0077984 A1 * | 6/2002 | Ireton .......................... 705/51 |
| 2003/0120629 A1 * | 6/2003 | Hsieh ............................ 707/1 |

FOREIGN PATENT DOCUMENTS

JP     10-320340     12/1998

* cited by examiner

*Primary Examiner*—Jason Cardone
*Assistant Examiner*—Minh-Chau Nguyen
(74) *Attorney, Agent, or Firm*—Oblon, Spivak, McClelland, Maier & Neustadt, P.C.

(57) ABSTRACT

A client terminal searches for servers on a home network when a song-data playback application is started up. When the client terminal receives a response from a server which was in connection therewith at the preceding operation, the client terminal establishes a preferential connection with the server and stops a process of searching for the servers. The client terminal obtains a list of album names and song data from the connected server so as to display the list, and plays back song data selected by a user by streaming.

10 Claims, 15 Drawing Sheets

FIG. 3A

| NAME OF CONNECTED SERVER | ID (IP ADDRESS) |
|---|---|
| tempest | **** |

FIG. 3B

| NAME OF SERVER | URL |
|---|---|
| tempest | http://192.168.1.2:54321/SonicStage/MediaServer/ContentDirectory/ |
| ...... | ...... |
| test-server | http://192.168.1.35:52854/SonicStage/MediaServer/ContentDirectory/ |

CONTENT PLAYBACK APPARATUS, SERVER CONNECTION METHOD, AND RECORDING MEDIUM

BACKGROUND OF THE INVENTION

1. Field of the Invention

The present invention relates to a home network in which home electric appliances, computers, and peripheral devices are connected through a network. The present invention also relates to a content playback apparatus, a server connection method, and a recording medium, which are used for connecting with a server on the network.

2. Description of the Related Art

In recent years, network techniques for connecting home electric appliances, computers, and peripheral devices through a network, transmitting/receiving the state of each device and various information, so as to improve the convenience and comfort for users, have been proposed. An in-home network, particularly, a network for connecting home electric appliances and computers, is referred to as a home network.

As the above-described home network, a network technique using a universal plug and play (UPnP) has been proposed. In UPnP, a user only has to connect home electric appliances, computers, and peripheral devices through a network, without complicated operations and setup operations. In order to allow the home network to operate, devices connected through the network need to automatically obtain information about the other devices so that each device on the network can transmit/receive information to/from the other devices on the network.

Accordingly, in a home network using UPnP, when an apparatus (client terminal) is brought into connection with the network, the client terminal can automatically find a server providing various services. More specifically, as shown in FIG. 15A, when a client terminal 1 is connected to a home network 3 (the connection includes power-on and start-up of application), the client terminal 1 issues a service discovery request (SD request), which is transmitted through the home network 3. In response to this request, as shown in FIG. 15B, servers 2-1 to 2-4 on the home network 3 transmit responses including their addresses and server names (host names) on the network and service content to the client terminal 1. The client terminal 1 receives the responses from the servers 2-1 to 2-4 so as to obtain information including the server names and addresses of the servers 2-1 to 2-4, the information being used for FF connection.

In the above-described home network using UPnP, a user has to wait for responses from all the servers 2-1 to 2-4 on the home network 3, the time depending on the number of servers. For example, the user waits for the response from each server for about 10 seconds, and the user obtains the list of servers when a timeout occurs. Therefore, the user has to wait for about 10 seconds of search processing in order to obtain the list of servers.

In order to solve this problem, the list of serves on the home network 3 may be registered on the client terminal 1 in advance. However, all the servers 2-1 to 2-4 on the home network 3 do not always operate, and the client terminal 1 is not always connected to the home network 3. Thus, the list of servers registered in advance cannot be used in practice. Also, one of the characteristics of UPnP, that is, flexible participation to a network, plug and play, will be damaged. Therefore, the list of serves 2-1 to 2-4 on the network 3 must be obtained every time the client terminal 1 is connected to the home network 3 or every time an application is started up, and thus a waiting time for search processing is inevitably generated.

Further, the user must select a server to be connected from the list of servers every time he or she connects the client terminal 1 to the network 3 or every time he or she starts up the application. If the number of servers on the home network 3 is small, a problem does not occur. However, if the number of servers is large, a complicated operation is needed for selecting a server, and the degree of convenience is decreased.

SUMMARY OF THE INVENTION

Accordingly, it is an object of the present invention to provide a content playback apparatus, a server connection method, and a recording medium, in which server search time can be reduced while maintaining a function of automatically finding a server and the operationality can be increased.

In order to achieve the above-described object, a content playback apparatus of the present invention comprises a storage unit for storing information of a specific content-server based on a connection history; a transmission unit for transmitting a request to all content-servers on a network; a connection unit for establishing a preferential connection with the specific content-server upon receipt of response from the specific content-server, the response being transmitted in response to the request; and a control unit for stopping an operation of obtaining a list of the content-servers.

A server connection method of the present invention comprises a transmission step of transmitting a request from a client apparatus to all content-servers on a network; a connection step of establishing a preferential connection with a specific content-server upon receipt of a response from the specific content-server whose information is stored based on a connection history, the response being transmitted in response to the request; and a control step of stopping an operation of obtaining a list of the content-servers after the connection step.

Also, the present invention provides a recording medium containing a server connection program which is executed by a computer. The program comprises a step of transmitting a request to all content-servers on a network; a step of establishing a preferential connection with a specific content-server upon receipt of a response from the specific content-server whose information is stored based on a connection history, the response being transmitted in response to the request; and a step of stopping an operation of obtaining a list of the content-servers after the step of establishing a preferential connection.

In the present invention, the information of the specific content-server is stored based on a connection history, and the request is transmitted from the client apparatus to all the content-servers on the network so as to receive a response from a content-server. Based on the received response, the list of servers which can be connected is obtained. By receiving a response from the specific content-server, the client apparatus is preferentially connected to the specific content-server, and an operation of obtaining the list of content-servers is stopped. Accordingly, time for searching for servers can be reduced while maintaining a function of automatically finding servers, and thus operationality can be increased.

BRIEF DESCRIPTION OF THE DRAWINGS

FIG. 3A shows the data structure of a connected-server-name storage unit and FIG. 3B shows the data structure of a server-list storage unit;

DESCRIPTION OF THE PREFERRED EMBODIMENT

Hereinafter, an embodiment of the present invention will be described with reference to the drawings.

A. Construction

Figure 1:
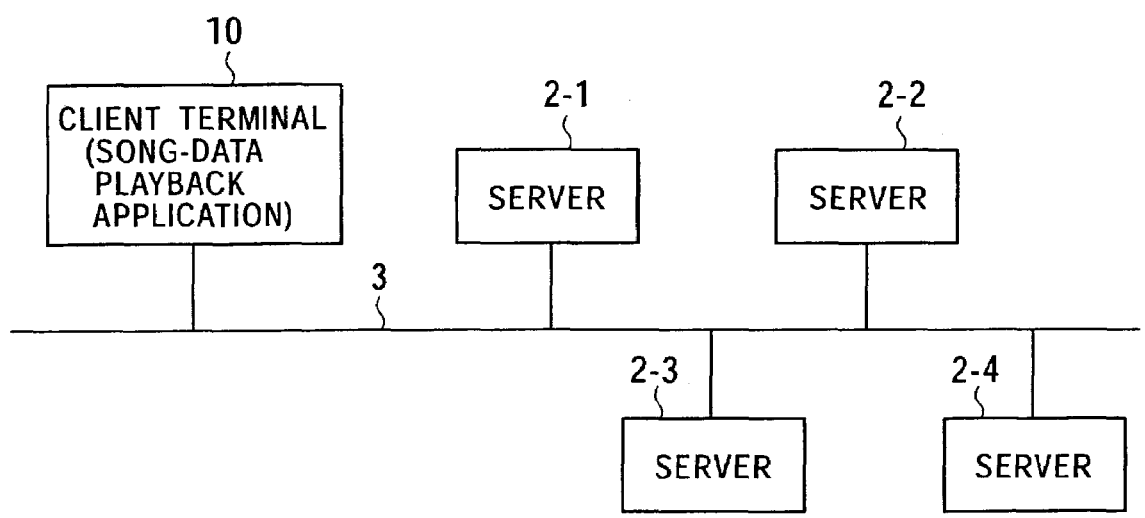
FIG. 1 is a block diagram showing the configuration of a home network according to an embodiment of the present invention.
Figure 15A:
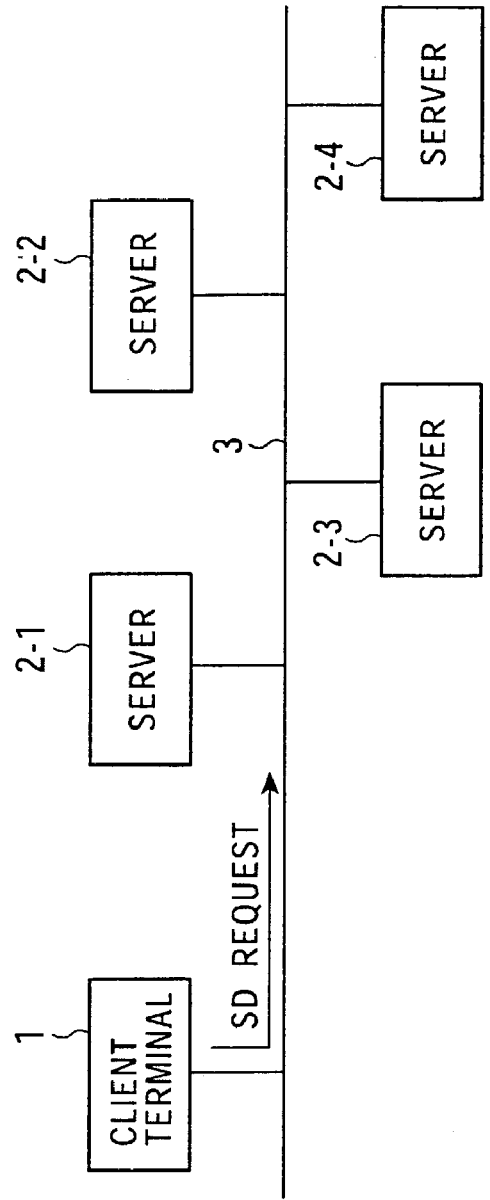
FIG. 15 illustrates the operation in a home network using UPnP in a known art.
Figure 15B:
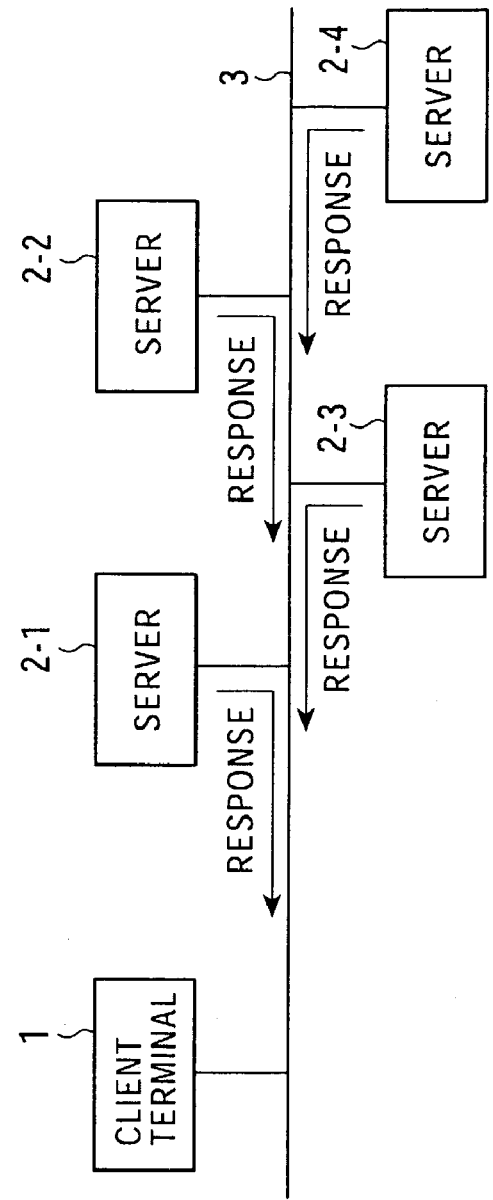

FIG. 1 is a block diagram showing the configuration of a home network according to the embodiment of the present invention. In the embodiment, song data which is managed and offered by a server is played back by streaming by a client terminal in a home network environment using UPnP. In FIG. 1, parts which correspond to those in FIG. 15 are denoted by the same reference numerals, and the corresponding description will be omitted.

In a home network 3, at least one client terminal 10 and a plurality of servers 2-1 to 2-4 are connected through communication media, such as radio, a telephone line, a power supply line, IrDA, Ethernet®, and IEEE 1394. The client terminal 10 searches for the servers 2-1 to 2-4 on the home network 3 when a song-data playback application (hereinafter referred to as application) is started up or when a user generates instructions. Also, the client terminal 10 plays back music data managed by a desired server by streaming in response to user's instructions.

In particular, the client terminal 10 of the embodiment stores the host name and ID (URL) of the server which was in connection therewith at the preceding operation (the server which was in connection therewith when the application was quitted). When the client terminal 10 searches for servers and finds the server which was in connection therewith at the preceding operation, the client terminal 10 establishes a preferential connection with that server and stops the search. Accordingly, time required for searching for servers can be reduced compared to the known method in which a list of servers can be obtained after receiving responses from all the servers. When the server which was in connection at the preceding operation cannot be found, the client terminal 10 waits for the responses from the servers 2-1 to 2-4 on the home network 3 until a timeout occurs, the timeout being set in advance, and then the list of the servers can be obtained.

Each of the servers 2-1 to 2-4 manages a list of album names and song data, receives a request from the client terminal 10, and supplies the list of album names and song data to the client terminal 10. Also, when the client terminal 10 requests playback of a song of a specific URL, each of the servers 2-1 to 2-4 supplies the corresponding album name and song data, which are stored in each server, to the client terminal 10.

Figure 2:
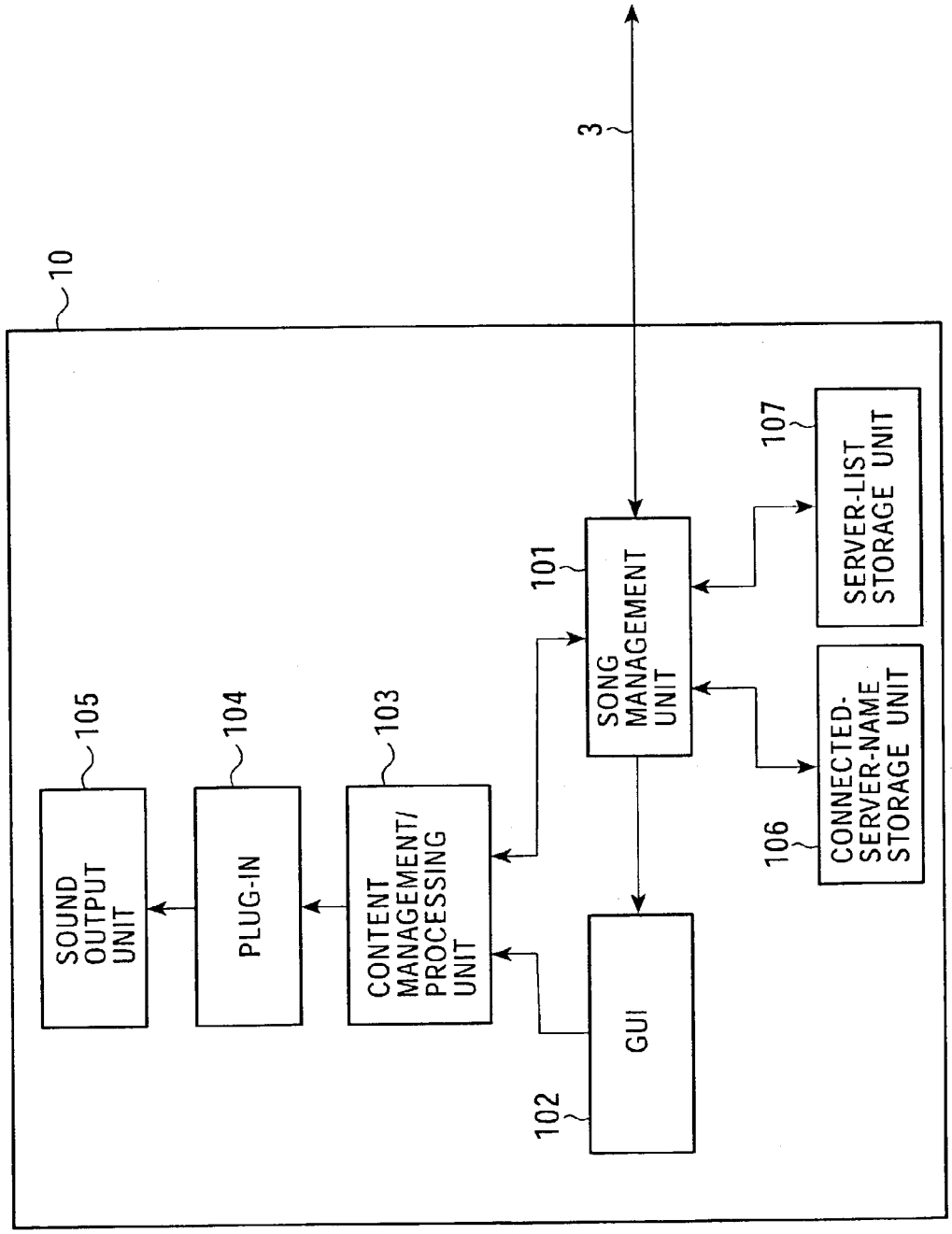
FIG. 2 is a block diagram showing the configuration of a client terminal.

FIG. 2 is a block diagram showing the configuration of the client terminal 10. A song management unit 101 communicates with one of the servers on the home network 3 so as to manage lists of albums and songs obtained from the server. More specifically, when a GUI 102 (described later) generates a request or at startup, the song management unit 101 searches for the servers 2-1 to 2-4 on the home network 3, obtains the ID and name of all albums and songs stored in a predetermined server, and supplies them to the GUI 102. Also, the song management unit 101 receives the ID of an album and song from a content management/processing unit 103 (described later), obtains the URL of the song data corresponding to the ID of the album and song from a server, and supplies the URL to the content management/processing unit 103.

The GUI 102 obtains lists of albums and songs from the song management unit 101 so as to display the ID and the name of each album and each song on a display. Further, when the user selects an album and a song from the lists of albums and songs and instructs to play back the selected song, the GUI 102 supplies the ID of the selected song to the content management/processing unit 103.

The content management/processing unit 103 receives the ID of the song from the GUI 102, supplies it to the song management unit 101, obtains the URL of the song corresponding to the ID from the song management unit 101, and supplies the URL to a plug-in 104.

The plug-in 104 reads song data in various data formats (MP3, WMA, and so on) from the content management/processing unit 103, decrypts the song data, and supplies the song data to a sound output unit 105. That is, in order to play back song data in a plurality of data formats, a plurality of plug-ins corresponding to the data formats are required. The sound output unit 105 receives the decrypted song data from the plug-in 104 so as to output the data as music.

As shown in FIG. 3A, a connected-server-name storage unit 106 stores the name of the server which was in connection at the preceding startup of the client terminal 10 (name of connected server) and the identifier of the server. As shown in FIG. 3B, a server-list storage unit 107 stores a list of the names and URLs of the servers found on the home network 3.

B. Operation

Figure 4:
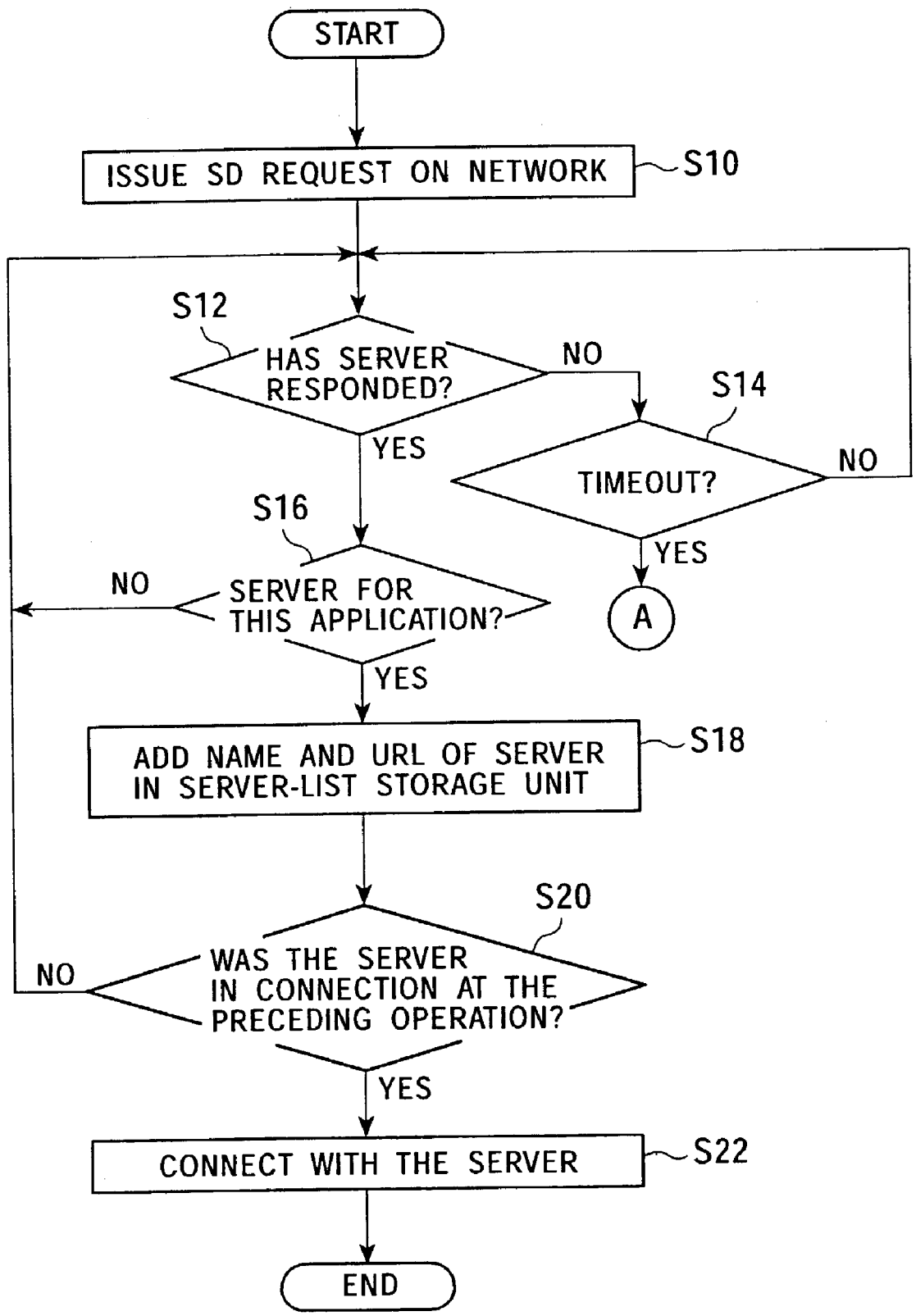
FIG. 4 is a flowchart illustrating an operation of obtaining a list of servers which is performed when a song-data playback application is started up in the client terminal.
Figure 5:
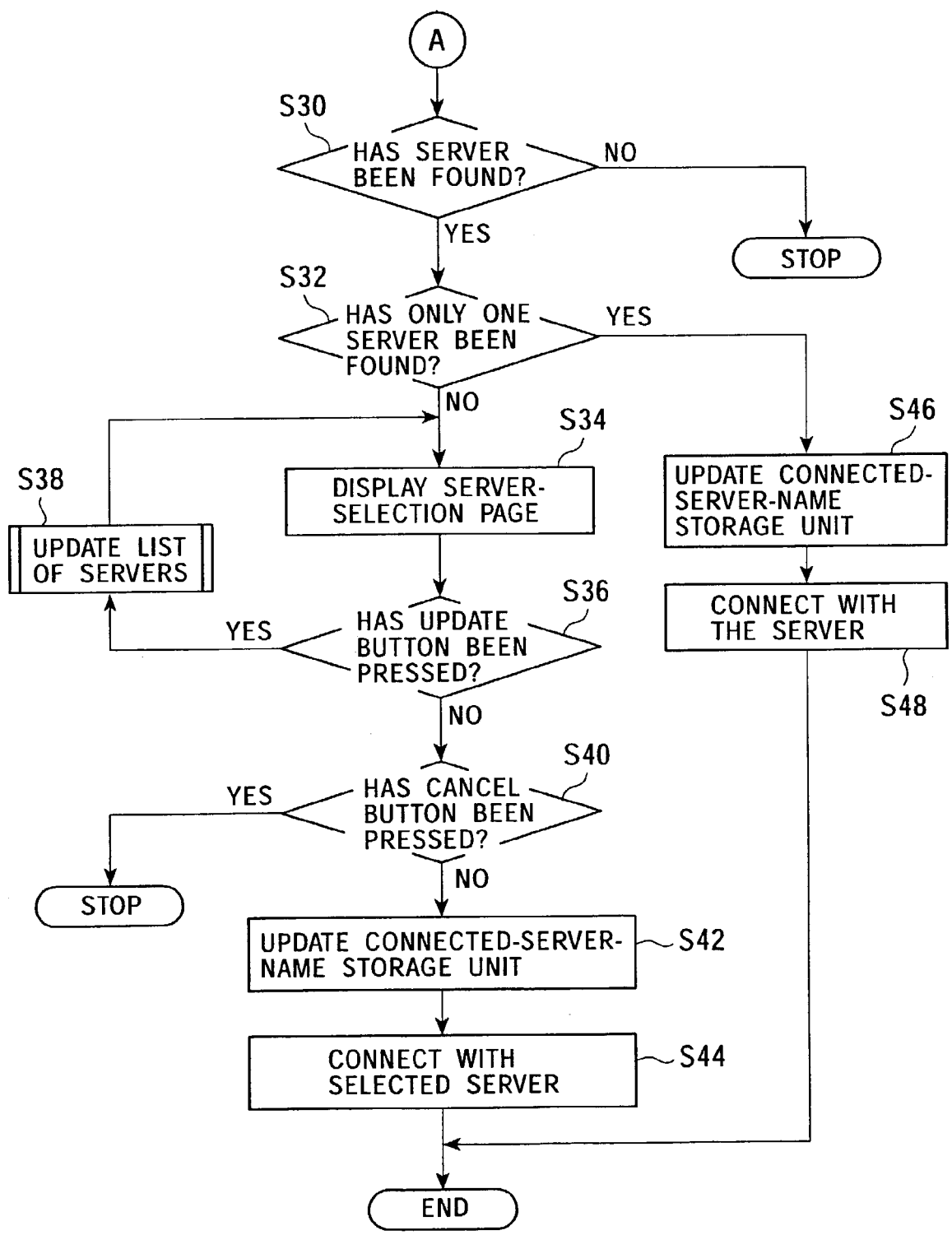
FIG. 5 is a flowchart illustrating an operation of obtaining a list of servers which is performed when the song-data playback application is started up in the client terminal.
Figure 6:
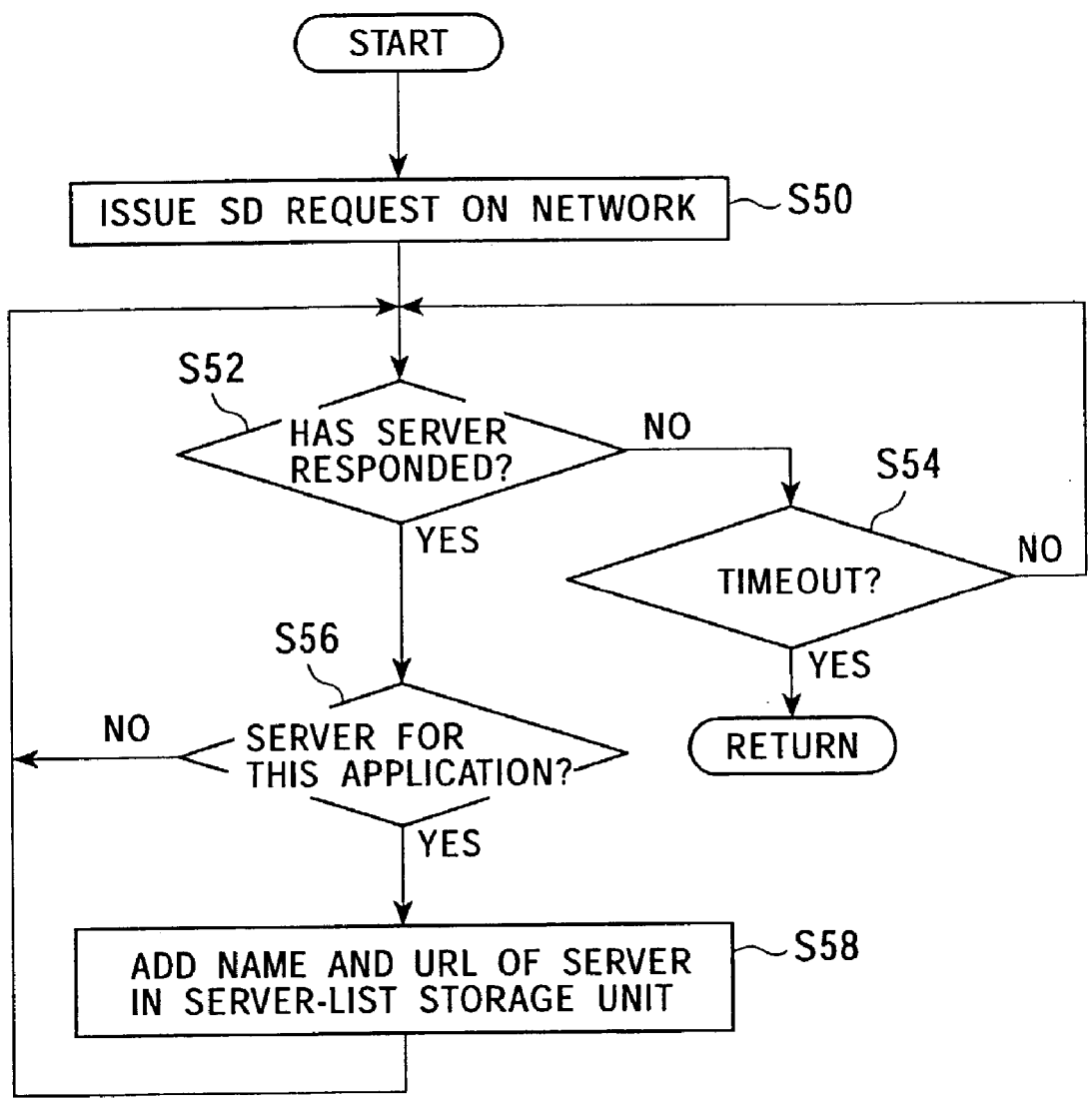
FIG. 6 is a flowchart illustrating an operation of obtaining a list of servers which is performed when the song-data playback application is started up in the client terminal.

Next, the operation of the above-described embodiment will be described. FIGS. 4 to 6 are flowcharts illustrating an operation of obtaining a list of servers, which is performed when the song-data playback application is started up in the client terminal 10. FIGS. 7 to 14 are schematic views showing examples of a display (GUI) when the operation of obtaining the list of servers is performed.

B-1. Operation of Obtaining a List of Servers

When the client terminal 10 (application) is started up, the client terminal 10 issues (broadcasts) a service discovery request (SD request) on the home network 3 (step S10), and determines whether or not it has received a response from the servers 2-1 to 2-4 (step S12). If the client terminal 10 has not received a response from any of the servers 2-1 to 2-4, it determines whether or not a timeout (10 seconds, for example) has occurred (step S14). If the timeout has not yet occurred, the process returns to step S12 so as to enter a response waiting state where the client terminal 10 waits for a response from the servers 2-1 to 2-4 on the home network 3.

Figure 7:
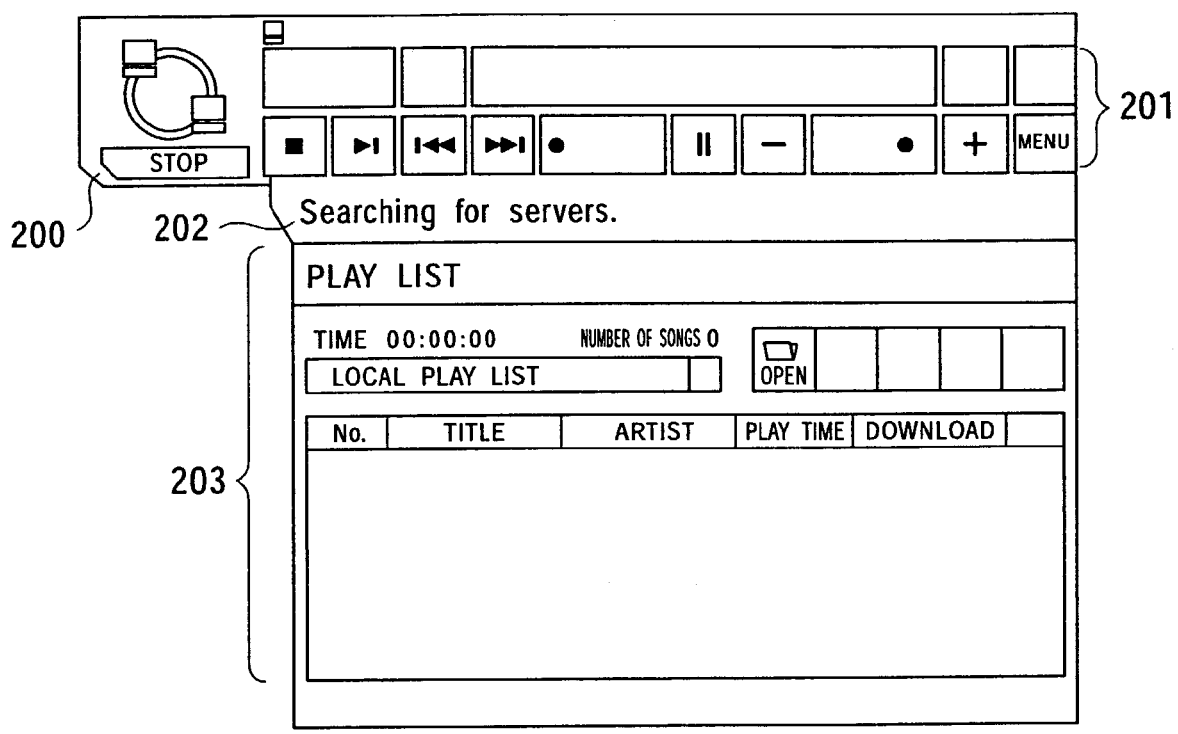
FIG. 7 is a schematic view showing a page of server search.

FIG. 7 is a schematic view showing the display of the application in the response waiting state. A state of connection to the home network 3 is displayed in a display region 200. Herein, a rotating graphic represents a state where servers are being searched for. Also, various control buttons (stop, playback, pause, fast-forward, rewind, and so on) are displayed in a display region 201. These buttons are pressed by clicking with a mouse or the like so that operation instructions for the application can be generated. A message indicating a current operation state is displayed in a display region 202. In FIG. 7, a message "Searching for servers" is displayed. Further, a list of albums and songs which are managed and offered by a connected server is displayed in a display region 203.

In the response waiting state, when the client terminal 10 receives a response from any of the servers 2-i (i=1 to 4), the client terminal 10 determines whether or not the server 2-i is for this application (step S16). If the server is not for this application, the process returns to step S12 so as to wait for a response from another server. On the other hand, when the server is for this application, the name and URL of the server is added to the server-list storage unit 107 (step S18).

Then, by referring to the connected-server-name storage unit 106, the client terminal 10 determines whether or not the server is the server which was in connection therewith at the preceding operation (server which was in connection therewith when the application was quitted) in step S20. If the server is not the server which was in connection therewith at the preceding operation, the process returns to step S12 so as to wait for a response from any of the servers on the home network 3. When the client terminal 10 receives a response from a server except the server which was in connection at the preceding operation until the timeout occurs, the name and URL of the server are added to the server-list storage unit 107.

Hereinafter, a case where the server which was in connection at the preceding operation cannot be found, or a case where the information of the server which was in connection at the preceding operation is not stored in the connected-server-name storage unit 106 at startup and where the timeout has occurred, will be described. In this case, in the above-described process of obtaining the list of servers, the client terminal 10 receives a response from any (one or more) of the servers on the home network 3 and the name and URL of the server are stored in the server-list storage unit 107, or no server exists on the home network 3.

In any case, when the timeout occurs during the process of obtaining the list of servers, it is determined whether or not a server has been found (step S30 in FIG. 5). If a server has not been found, the process is stopped. In this case, a message indicating that a server has not been found may be displayed on the application display.

Figure 8:
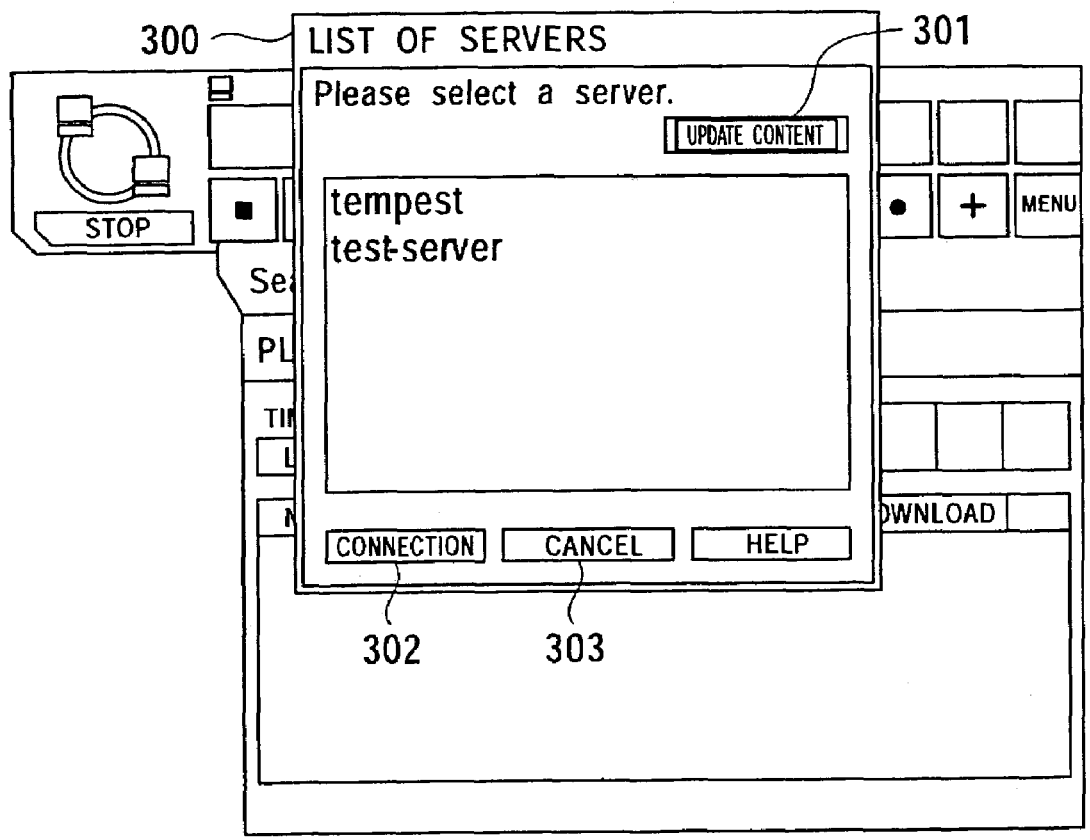
FIG. 8 is a schematic view showing a page of server selection.

On the other hand, when a server has been found, it is determined whether or not only one server has been found (step S32). If a plurality of servers have been found, a server-selection page is displayed (step S34). FIG. 8 is a schematic view showing the server-selection page. In the server-selection page 300, the names of servers found by search are displayed. Also, a content update button 301 for updating the list of servers, connection button 302 for connecting to a selected server, and a cancel button 303 for canceling the display of the list of servers are displayed.

In the application of the client terminal 10, it is determined whether or not the content update button 301 has been pressed (step S36) while the server-selection page 300 is displayed, and then it is determined whether or not the cancel button 303 has been pressed (step S40). When the cancel button 303 is pressed, the process is stopped without holding the list of servers displayed on the server-selection page 300. On the other hand, when the content update button 301 is pressed, the list of servers is updated (step S38) by a process of updating the list of servers, which will be described later, and then, the process returns to step S34 so as to display the list of servers again.

On the other hand, when a server is selected from the list of servers which is displayed on the server-selection page 300 and when the connection button 302 is pressed, the information of the selected server 2-i is stored in the connected-server-name storage unit 106 as a server which will be connected preferentially at the next operation so that the connected-server-name storage unit 106 is updated (step S42). Then, the client terminal 10 is connected to the selected server 2-i (step S44).

Figure 9:
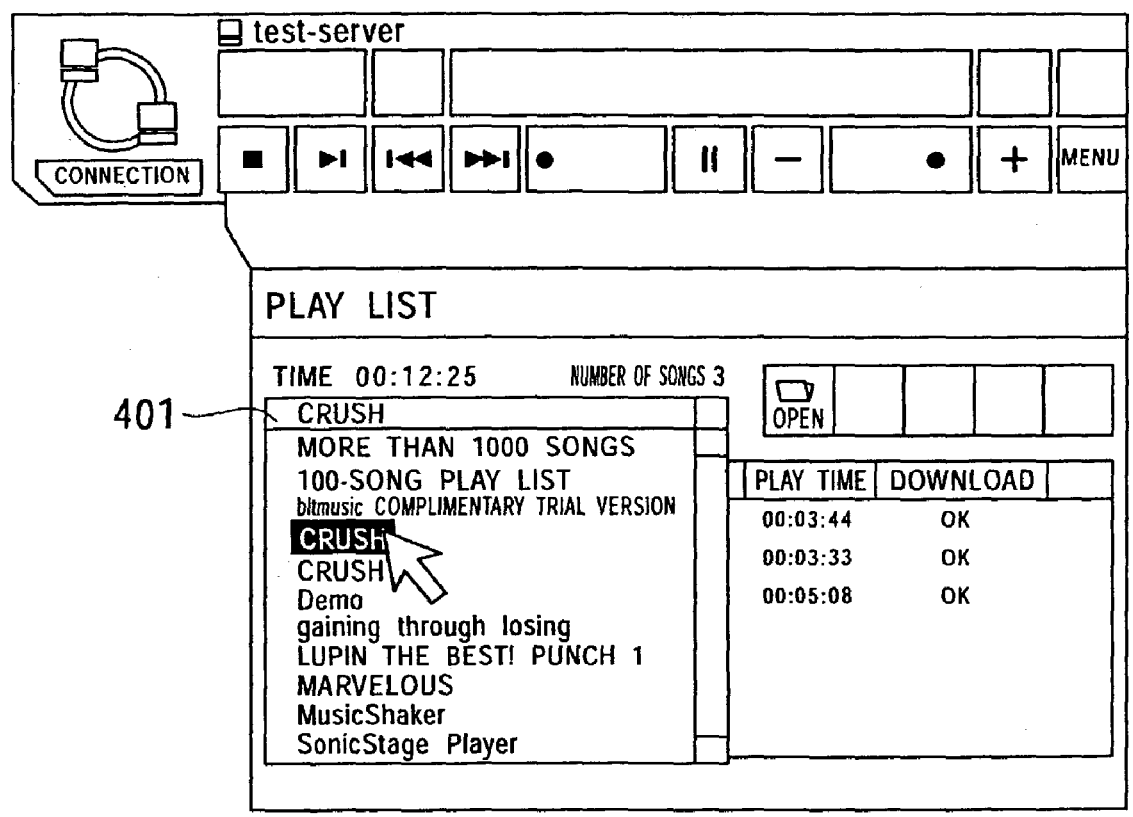
FIG. 9 is a schematic view showing a page for selecting an album name and a song in a connected server.
Figure 10:
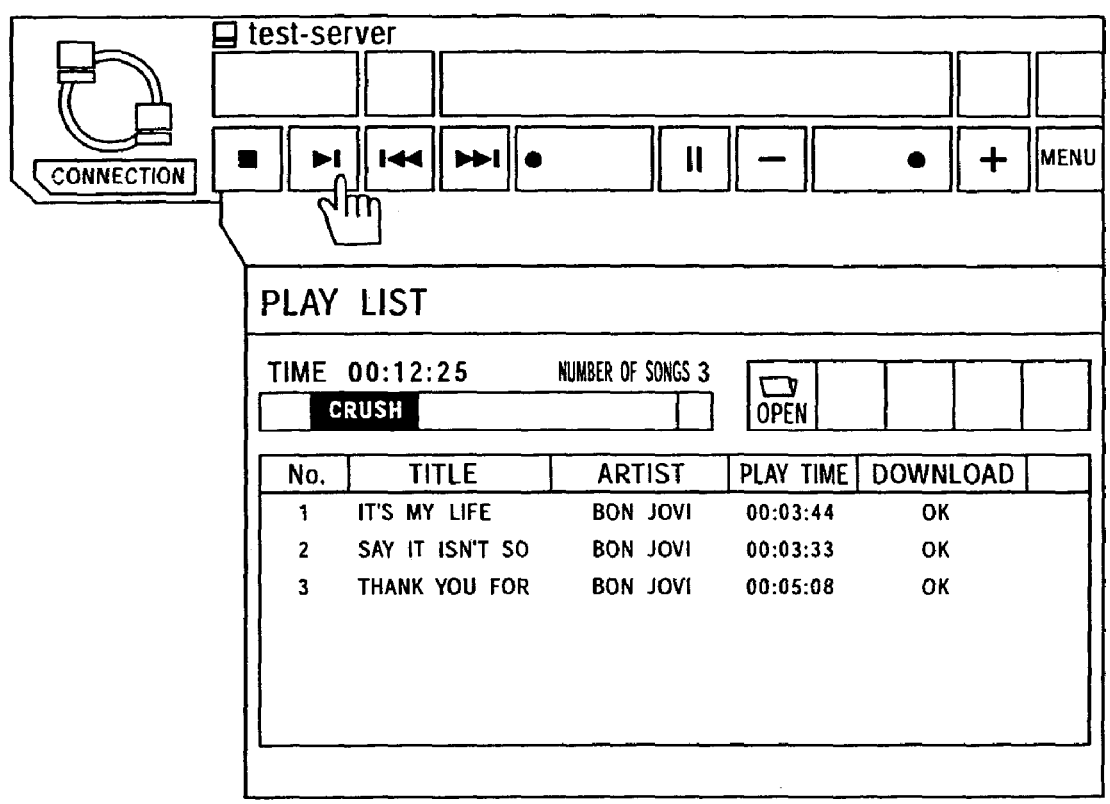
FIG. 10 is a schematic view showing a page displayed when song data in the connected server is played back.

FIG. 9 is a schematic view showing a page displayed when a connection with "test-server" is established. When the client terminal 10 is connected with the selected server 2-i, it obtains the list of album names and song names which are managed and offered by the server 2-i, and as shown in 401 of FIG. 9, the album names and song names are displayed in a play list. Then, the user selects a desired album name and song name from the play list. As shown in FIG. 10, by pressing a playback button, the song data of the selected album and song is played back.

More specifically, the song management unit 101 obtains the list of album names and song names which are managed and offered by the server 2-i, and the album names, song names, and IDs are supplied to the GUI 102. The GUI 102 displays a play list in accordance with the album names, song names, and IDs. Then, the user selects a desired album name and song name from the play list and presses the playback button, and then the GUI 102 supplies the ID of the selected album name and song name to the content management/processing unit 103. The content management/processing unit 103 supplies the ID of the album name and song name to the song management unit 101. The song management unit 101 obtains the song data corresponding to the ID of the album name and song name from the connected server 2-i, and supplies the song data to the content management/processing unit 103. The content management/processing unit 103 supplies the obtained song data to the plug-in 104. The plug-in 104 decrypts the song data from the content management/processing unit 103 so as to supply the decrypted data to the sound output unit 105, and the data is output as music.

B-2. Preferential Connection Process

Figure 11:
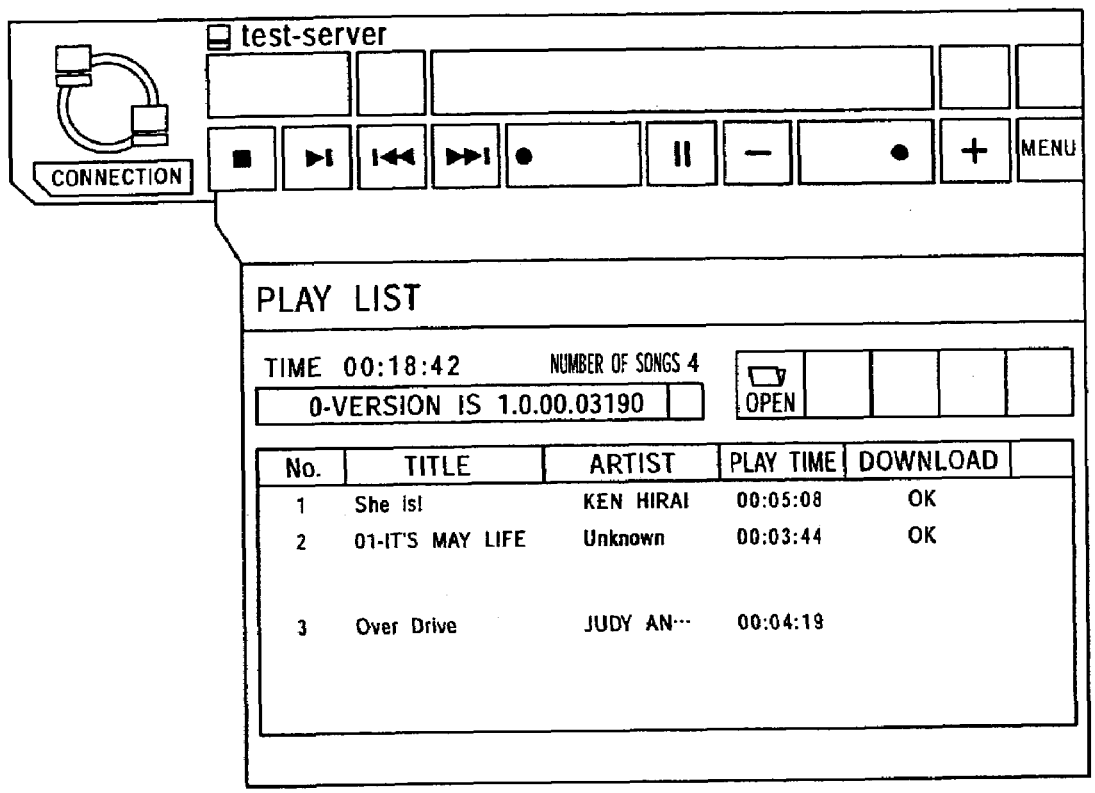
FIG. 11 is a schematic view showing a page displayed when the client terminal is preferentially connected to a server which was in connection therewith at the preceding operation.
Figure 12:
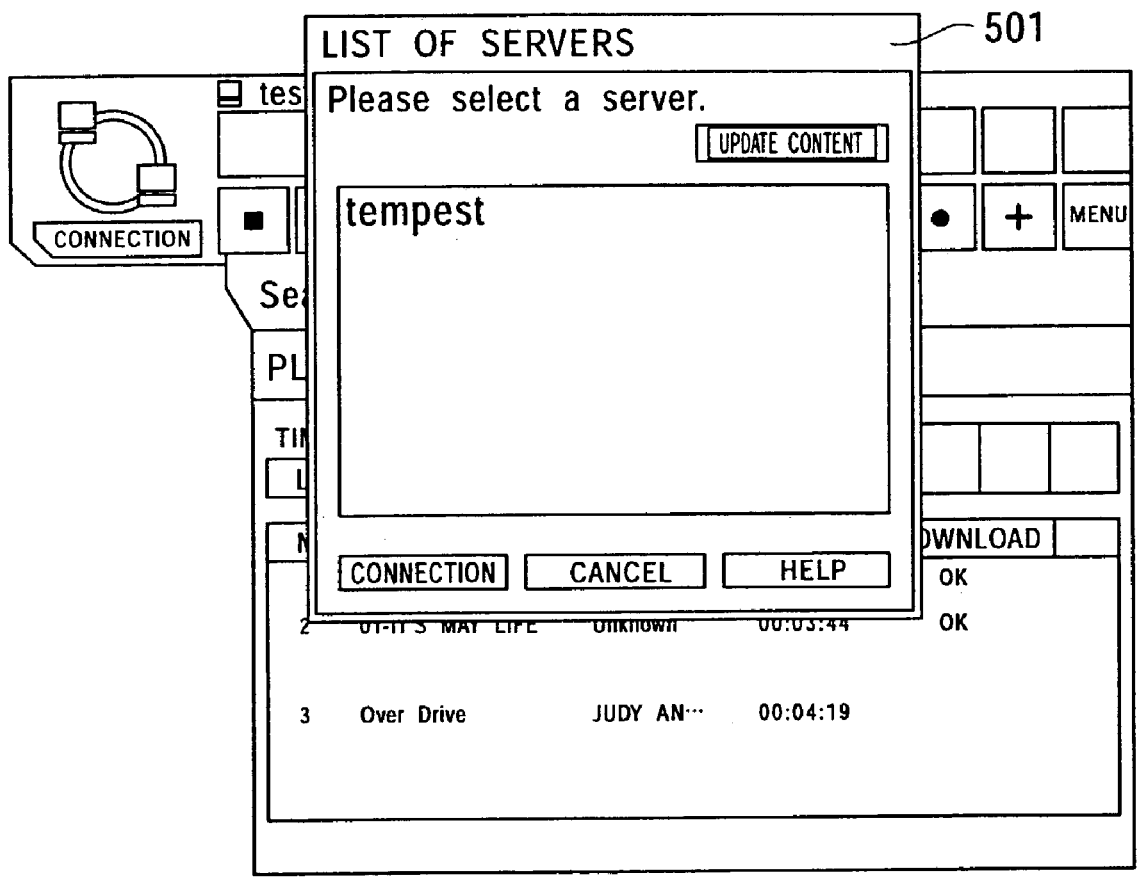
FIG. 12 is a schematic view showing a page of a list of servers before a process of updating the list of servers is performed.
Figure 13:
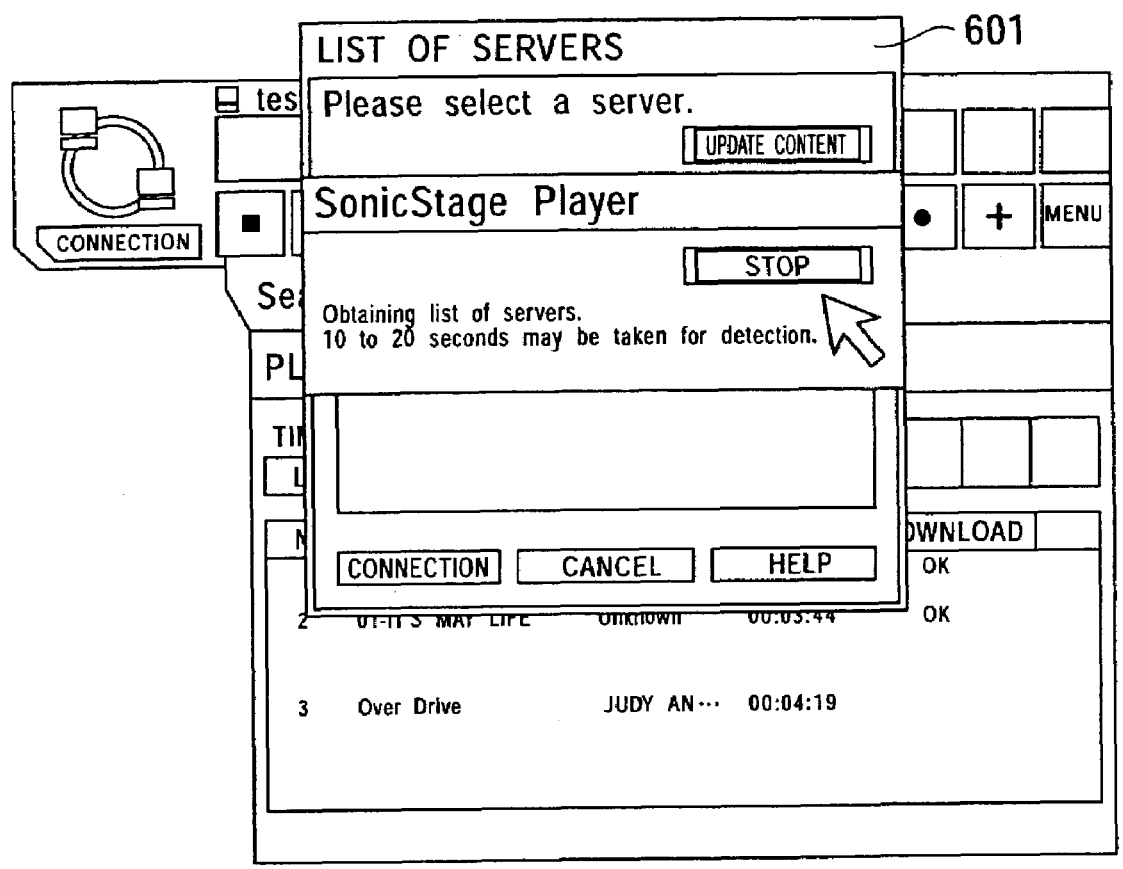
FIG. 13 is a schematic view showing a page displayed during search in the process of updating the list of servers.
Figure 14:
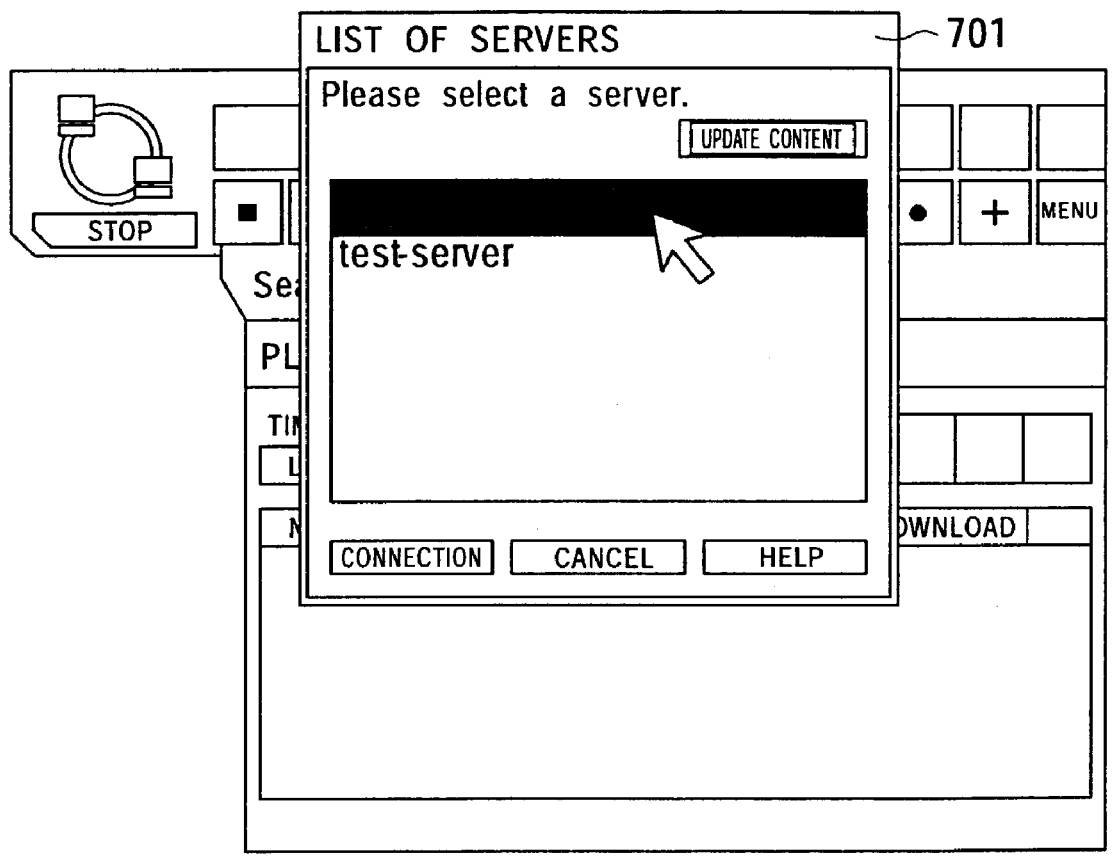
FIG. 14 is a schematic view showing a page of the list of servers displayed after the process of updating the list of servers.

Next, an operation of preferentially connecting to a server which was in connection at the preceding operation will be described. When the application is started up, the process of obtaining the list of servers is performed in accordance with the flowchart shown in FIG. 4. At this time, the process of obtaining the list of servers has been once performed so as to connect with the server 2-i and play back song data. Thus, the information of the server 2-i is stored in the connected-server-name storage unit 106. Therefore, in the state of waiting for a response from a server shown in FIG. 7, when the client terminal 10 receives the response from the server 2-i which was in connection at the preceding operation in step S20, the client terminal 10 establishes a preferential connection with the server 2-i (step S22), so as to finish the operation of obtaining the list of servers. As shown in FIG. 11, the album names and song names which are managed and offered by the server 2-i which was in connection at the preceding operation are displayed in the play list in the client terminal 10. Accordingly, in order to rapidly connect to a server and to play back song data, the user need not wait for the responses from all the servers 2-1 to 2-4 so as to obtain the list of servers (time can be saved) and also the user need not select a desired server from the list of servers (operation is simplified).

B-3. Process of Updating List of Servers

Next, the process of updating the list of servers, which is performed when the content update button 301 is pressed in the above-described step S38, will be described. In the server-selection page 300 containing the list of found servers shown in FIG. 8, when the content update button 301 is pressed, the process of updating the list of servers, shown in FIG. 6, is performed. In this process, an SD request is issued on the home network 3 (step S50), and it is determined whether or not the client terminal 10 has received a response from any of the servers 2-1 to 2-4 (step S52). If the client terminal 10 has not received a response from the servers 2-1 to 2-4, it is determined whether or not a timeout (10 seconds, for example) has occurred (step S54). If the timeout has not yet occurred, the process returns to step S52 so as to enter a response waiting state where the client terminal 10 waits for a response from the servers 2-1 to 2-4 on the home network 3 as shown in a page 601 in FIG. 13.

In the response waiting state, when the client terminal 10 receives a response from any of the servers 2-1 to 2-4, it is determined whether or not the responded server is for this application (step S56). If the server is not for this application, the process returns to step S52 so as to wait for a response from another server. On the other hand, if the server is for this application, the name and URL of the server are added to the server-list storage unit 107 (step S58). When the timeout occurs during the process of obtaining the list of servers, the process returns to step S38 in the flowchart shown in FIG. 5, the process proceeds to step S34, and as shown in a page 701 in FIG. 14, the list of found servers is displayed. That is, in the process of updating the list of servers, the client terminal 10 waits for the responses from all the servers on the home network until the timeout occurs, so as to obtain the list of servers which have responded. Then, server selection and playback of song data are performed as described above.

In the above-described embodiment, search for servers can be restarted by pressing the content update button 301 in the page of server list (selection page). Alternatively, after a connection with the server which was in connection at the preceding operation has been established, search for servers may be continued by a background process, so as to obtain the list of servers on the home network.

Also, in the above-described embodiment, the client terminal 10 is preferentially connected to the server which was in connection at the preceding operation. Alternatively, history information such as the number of connections may be stored, the history information is referred to during search, and the client terminal 10 may be preferentially connected to a server which has been connected therewith many times.

Further, in the above-described embodiment, album names and song data are used as content offered by servers. Alternatively, the content may be moving or still pictures. Also, an apparatus for providing content need not be a server, but may be AV equipment.

What is claimed is:

1. A content playback apparatus, comprising:
   a storage unit configured to store information of a specific content-server based on a connection history;
   a transmission unit configured to transmit a request to all content-servers on a network;
   a connection unit configured to detect a plurality of content-servers that respond to the connection request in a predetermined period after transmission of the connection request, and connect with one of the plurality of content-servers, wherein
   the connection unit stops detection of content-servers when a response from the specific content-server is received and connects with the specific content-server, even during the predetermined period.

2. The content playback apparatus according to claim 1 wherein, when a connection has not been made with the specific content-server at the end of the predetermined period, the connection unit is further configured to obtain a list of the plurality of content-servers that respond to the connection request and connect to one of the plurality of content-servers selected from the list by a user.

3. The content playback apparatus according to claim 2, further comprising:
   a content-server list storage unit configured to store connection information of the content-servers which can be connected and which responded during the operation of obtaining the list of the content-servers; and
   a display unit configured to display the list of content-servers whose information is stored in the storage unit when the user instructs display of the list,
   wherein the connection unit is configured to connect to a content-server selected by the user from the list which is displayed by the display unit.

4. The content playback apparatus according to claim 3, wherein, when the user issues an instruction to update the list of the content-servers while the list of the content-servers is displayed by the display unit, the connection unit is configured to transmit the request to all the content-servers on the network and obtain the list of the content-servers which can be connected based on a response from the content-server.

5. The content playback apparatus according to claim 1, wherein the specific content-server is a content-server connected to the content playback apparatus immediately before the specific content-server is disconnected from the network at a preceding operation.

6. The content playback apparatus according to claim 1, wherein the specific content-server is a content-server which has been connected to the content playback apparatus most frequently.

7. The content playback apparatus according to claim 1, wherein the specific content-server is a content-server which was connected to the content playback apparatus immediately before software for playing back content was ended at a preceding operation.

8. A server connection method comprising:
   transmitting a request from a client apparatus to all content-servers on a network;
   detecting, by the apparatus, a plurality of content-servers that respond to the transmitted request in a predetermined period after transmitting the request, and connecting to one of the plurality of content-servers, wherein detecting is stopped when a response from a specific content-server, whose information is stored based on a connection history, is received even during the predetermined period.

9. A recording medium containing a server connection program which is executed by a computer, the program comprising:

transmitting from an apparatus a request to all content-servers on a network; and detecting a plurality of content-servers that respond to the request in a predetermined period after transmitting the request and connecting with one of the plurality of content-servers, wherein detecting stops when a response is received from a specific content-server whose information is stored based on a connection history, even during the predetermined period.

10. A content playback apparatus, comprising:

storage means for storing information of a specific content-server based on a connection history;

transmission means for transmitting a request to all content-servers on a network;

connection means for detecting a plurality of content-servers that respond to the request in a predetermined period after transmitting the request and connecting with one of the plurality of content-servers, wherein detecting stops when a response is received from the specific content-server, even during the predetermined period.

* * * * *